Figure 1A:
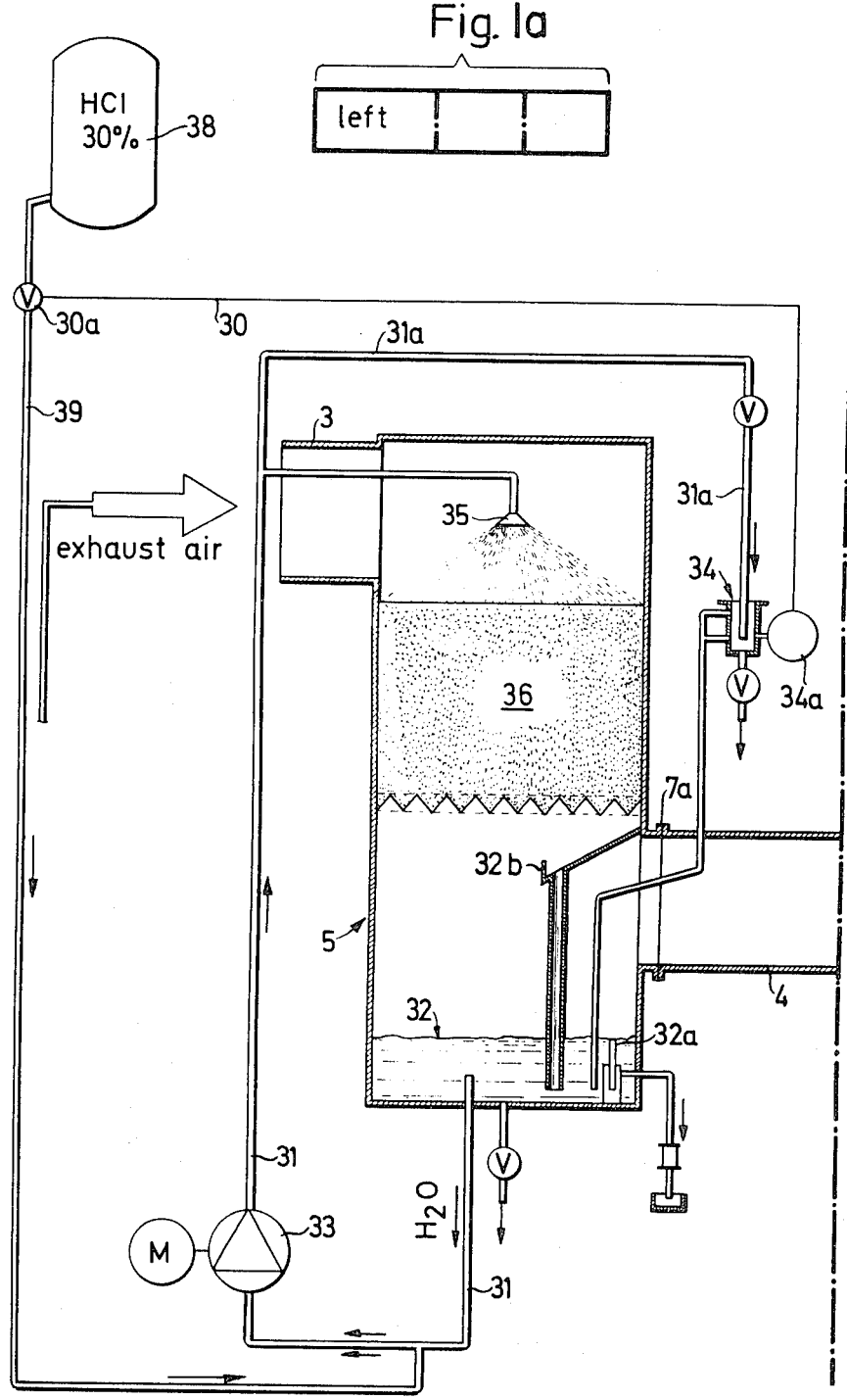
Figure 1C:
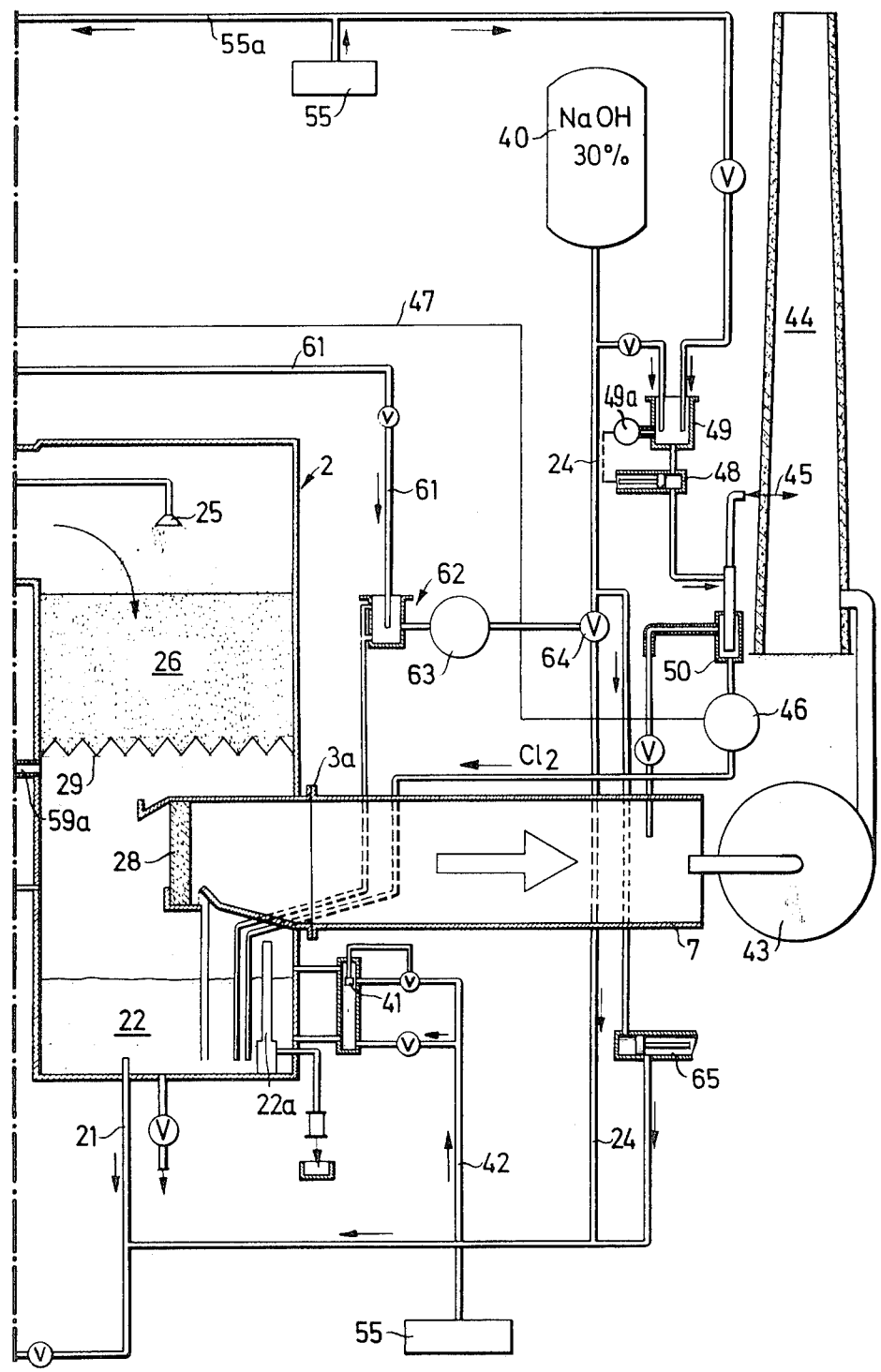

United States Patent [19]

Fattinger

[11] 3,923,955

[45] Dec. 2, 1975

[54] PROCESS FOR DEODORISING WASTE OR EXHAUST GASES

[75] Inventor: Volker Fattinger, Arlesheim, Switzerland

[73] Assignee: Ciba-Geigy Corporation, Ardsley, N.Y.

[22] Filed: July 29, 1974

[21] Appl. No.: 492,366

[30] Foreign Application Priority Data

Aug. 2, 1973 Switzerland.................... 11225/73
May 15, 1974 Switzerland.................... 6645/74

[52] U.S. Cl. ................ 423/210; 423/220; 423/241
[51] Int. Cl.² ........................................ B01D 53/34
[58] Field of Search ............ 423/210, 241, 220, 240

[56] References Cited
UNITED STATES PATENTS 2,962,344   11/1960   Kurmeier ........................ 423/210

*Primary Examiner*—L. Dewayne Rutledge
*Assistant Examiner*—Arthur J. Steiner

[57] ABSTRACT

A process for deodorising waste or exhaust gases, preferably containing $CO_2$, in at least two washing stages with introduction of active chlorine, wherein a stream of the waste gas to be deodorised is subjected in an initial chlorine washing stage to the action of a washing liquid containing active chlorine and in a subsequent chlorine washing operation to the action of a washing liquid, likewise containing active chlorine, of alkaline pH is described. This process is improved by the following features:

a. the supplied active chlorine is practically free from chlorine dioxide;
b. a content of at least 0.02 g of active chlorine per litre of washing liquid is maintained in at least one of the washing stages;
c. the pH-value of the washing liquid in the first washing stage, through which the waste gas to be purified, is flowing, is kept to between 4 and 9, and
d. the pH-value of the washing liquid in the subsequent washing stage is kept between 7 and 11, with the pH-value in the said subsequent washing stage being adjusted to remain higher by 0.3 to 4 than the pH-value in the first stage;
e. active alkali is added in an approximately stoichiometric amount, calculated on total active chlorine supplied, in a subsequent washing stage.

22 Claims, 3 Drawing Figures

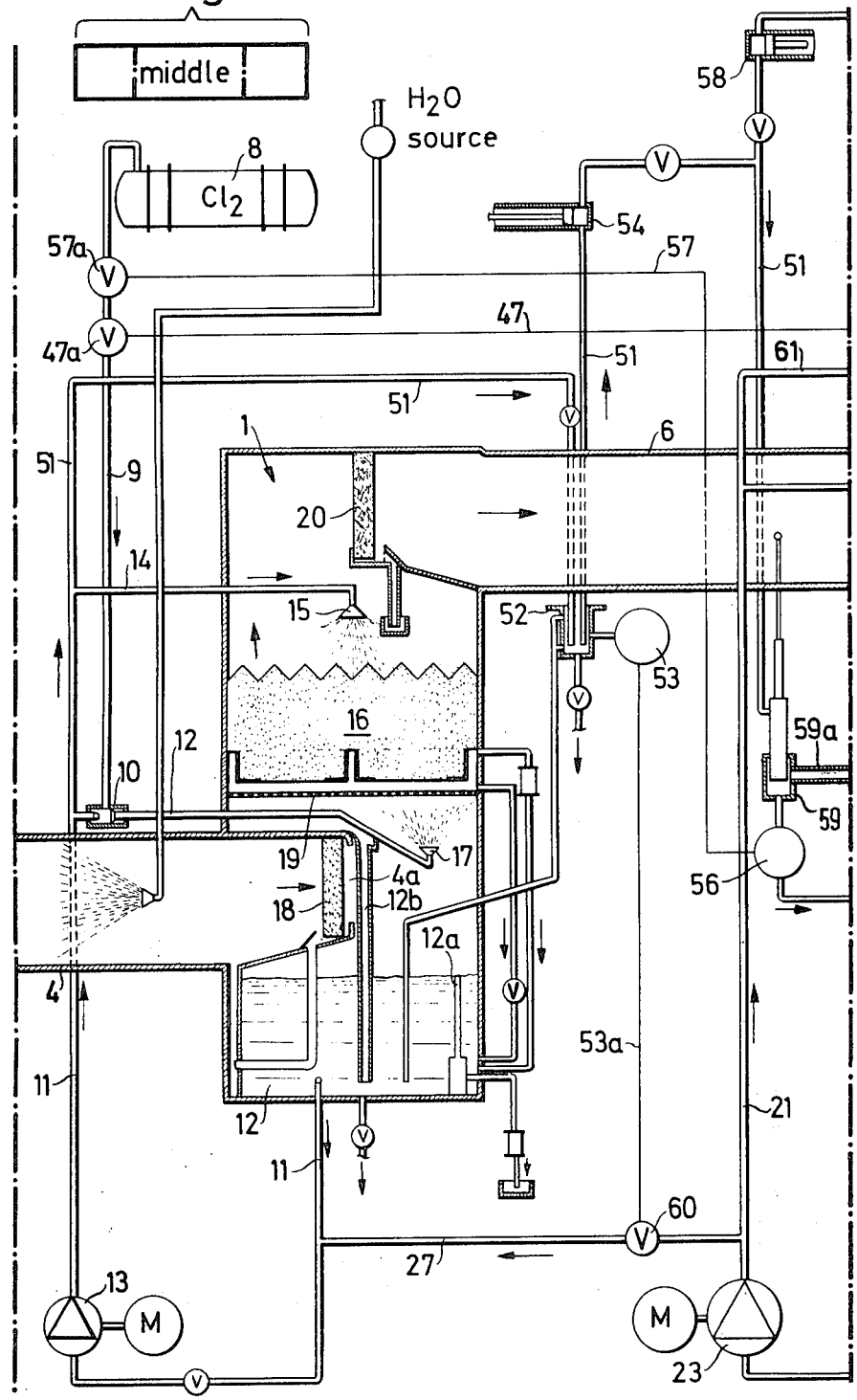

PROCESS FOR DEODORISING WASTE OR EXHAUST GASES

The present invention relates to a process for deodorising waste or exhaust gases, preferably containing $CO_2$, in at least two washing stages by introduction of active chlorine, in which process a stream of the waste gas to be deodorised is subjected in an initial chlorine washing stage to the action of a washing liquid containing active chlorine, and in a subsequent chlorine washing operation to the action of a washing liquid, likewise containing active chlorine, of alkaline pH.

A waste gas coming particularly into consideration is exhaust air containing intensely odorous organic substances, especially exhaust air from plants for the dewatering of waste-water (sewage) sludge, or from fermentation processes in the pharmaceutical industry.

In the processing of the sludge there are formed gases, which undergo a combustion operation. In practice, however, it is not possible to seal off the whole processing operation from the outside atmosphere to the extent that no contamination of the atmosphere by malodorous substances occurs. It is particularly during filtration, storage and transportation of thermally conditioned sludge that the air in a processing bay becomes contaminated with malodorous substances. As a result of this, the personnel operating in the works suffer considerable annoyance and the surroundings of the waste-water purification plant are unpleasantly affected.

If sufficient quantities of air are drawn out by suction to ensure a corresponding change of air in the works, then the problem for the personnel in the works is satisfactorily solved. However, in order to avoid a smell nuisance being created in surrounding areas by the volumes of air discharged from the works, a deodorising of these quantities of air is necessary.

The malodorous volumes of air can contain, in particular, amines and also sulphur-containing organic substances. The removal of these substances to an extent which no longer constitutes a nuisance requires a repeated gas washing. An essential condition for a gas washing of this kind is a clean separation of the washing media of the various stages, and a complete removal of the fine droplets of liquid, which form during the washing process, before the purified air is exhausted into the atmosphere.

As already described by Volker Fattinger in "Problems of atmospheric hygiene" [Probleme der Lufthygiene] (Chemische Rundschau, November 1972), $CO_2$-containing waste gases can be deodorised by treatment in at least two washing stages with washing liquid containing chlorine, chlorine dioxide or ozone.

As described in the said literature, a disadvantage of this process is on the one hand the formation of new odour-carriers, and on the other hand the excessive consumption of chemicals. This excessive consumption is caused by the $CO_2$-content. In particular, sodium hydroxide solution is consumed in this case for the $CO_2$-bond, and is thus lost for the actual deodorising process.

In the German Patent No. 861,836, a process of the kind initially described has already been suggested, wherein the main deodorising agent used is chlorine dioxide, which in itself is expensive, the said process being employed, in particular, for exhaust air, such as that occurring, for example, in soap manufacture or in the rendering of fats, since in this case the treatment with chlorine and hypochlorites in the usual manner is not adequate. In this process, the washing liquids in the circulation system are preferably to be adjusted to have, during the whole treatment, an alkaline pH-value, since at this value chlorine dioxide possesses its greatest oxidation potential. The removal of washing liquid for the purpose of replacing it with fresh washing liquid is preferably carried out from the first washing stage.

It is now the aim of the present invention to provide a process for deodorising preferably $CO_2$-containing gases, wherein the use of expensive chlorine dioxide is practically avoided; and wherein the advantages accruing from the use of chlorine dioxide as in the last-mentioned known process, namely, reduction of the amount of water to be circulated and applicability also at elevated water temperature (38°C), are likewise utilised, and, in addition, maximum degrees of separation of the intensity odorous substances from the waste gases are obtained with an acceptable consumption of chemicals less expensive than chlorine dioxide.

To achieve this aim, it is necessary that the following requirements and knowledge with respect to deodorising plants incorporating chlorine washing in several stages be taken into account. A maximum degree of separation requires a sufficient concentration of active chlorine at least in one of the washing stages. Furthermore, it is to be avoided in washing with high concentrations of chlorine that harmful amounts of chlorine gas filter through into the treated discharged gas.

Another factor is that the concentration of substances removed from the stream of gas being purified naturally increases in the washing liquid in the course of time, and it is therefore required that the washing liquid be renewed, either periodically or continuously. The liquid expelled in the discontinuous or continuous renewal operation has to be adjusted, both with respect to amount and concentration, to have a tolerable chlorine content, i.e. the loss of chlorine due to the discharged waste water must not be uneconomically high.

This problem is resolved according to the invention by a process of the initially described kind, wherein
  a. the supplied active chlorine is practically free from chlorine dioxide,
  b. a content of at least 0.02 g of active chlorine per liter of washing liquid is maintained in at least one of the washing stages,
  c. the pH-value of the washing liquid in the first washing stage, through which the waste gas to be purified is flowing, is kept at between 4 and 9, and
  d. the pH-value of the washing liquid in the subsequent washing stage is held between 7 and 11, with the pH-value in the said subsequent washing stage being adjusted to remain higher by 0.3 to 4 than the pH-value in the first stage.
  e. active alkali is added in an approximately stoichiometric amount, calculated on the total active chlorine supplied, in the said subsequent washing stage.

Chlorine-containing washing liquid can be fed, in a manner known per se, from the said subsequent washing stage back to the first washing stage; and, to effect replacement of washing liquid with fresh liquid, the removal of washing liquid can advantageously be performed from the first washing stage.

By 'washing stage' is meant that incorporated in any kind of apparatus wherein streams of gas are brought into intensive contact with liquids. Such apparatus can be, e.g.: washing or scrubbing towers, Venturiscrubbers or liquid-jet washers. Plants which have proved suitable are washing towers containing tower packing, such as Raschig rings, Pallringen or Berl-saddles ('Vereinigte Fullkorper-Fabriken GmbH and Co.', Baumbach, Westerwald, Germany), and drop-catching devices, such as are described in the Swiss Patent No. 392,464 of Oct. 15, 1965.

In order to obtain the washing liquids containing active chlorine, it is preferable either that gaseous chlorine is added to the waste gas, which is to be deodorised, before its introduction into the first chlorine washing stage, or that chlorine is injected into the first washing liquid. An aqueous hypochlorite solution can however also be used to introduce the required active chlorine into the washing liquid.

The term "active alkali" in the description and in the claims denotes in all cases the total alkali capable of binding chlorine: in particular, therefore, the sum of the equivalent amounts of sodium hydroxide solution, sodium bicarbonate and sodium carbonate.

If, in the processes according to the invention, only two chlorine washing stages in all are provided, then the stage denoted in this description and in the claims as the "first" chlorine washing stage is, of the two stages, the one into which the waste gas to be purified is initially introduced, whereas the stage denoted as "subsequent" stage is the second chlorine washing stage.

The consumed alkali in the washing liquids can in the process be replaced by the introduction of fresh alkali, preferably sodium hydroxide solution, in the subsequent chlorine washing stage. At the same time, washing liquid containing active chlorine can be fed from the subsequent washing stage back to the first, either continuously or, preferably, in dosed amounts depending on the pH-value of the first chlorine washing stage.

In the case of one of the preferred embodiments of the process according to the invention, optimum conditions in the washing stages are maintained by feeding into the first chlorine washing stage liquid containing chlorine or active chlorine, and into the second chlorine washing stage alkali liquor in a stochiometrically corresponding amount.

The fact that such a simple regulation of the addition of chemicals between the two chlorine-washing stages suffices to obtain the desired result is highly surprising, as it had been hitherto always assumed that a precise pH-control was always necessary in the case of treatment with chlorine. As a control value for the addition, according to the invention, of active chlorine to the first chlorine-washing stage, it is possible to use the content, expressed in g/l, of active chlorine in the washing liquid; or, alternatively, the chlorine content in the discharge gas from the first chlorine-washing stage can be used as a control value.

Only in the case of greater variations of pH-value in consequence of the formation of strongly acid or alkaline substances during washing is it necessary to effect an intensified adjustment of the pH-value by means of the usual measuring and dosing devices.

The process according to the invention is of particular practical value for the deodorising of waste gases containing at least 0.05 per cent by volume of $CO_2$, because it is possible according to the invention to maintain, after a saturation of the washing liquid with $CO_2$ has initially occurred, practically the same $CO_2$ content in the purified gases as in the crude gases to be treated. This means that $CO_2$ from the waste gas binds the least possible amount of active alkali in the washing liquid.

The content of active chlorine in the washing liquid of the second chlorine-washing stage is preferably higher than that in the first, for the reaction between the intensely odorous substances and chlorine occurs especially at the boundary layer between washing liquid and gas phase. It is therefore desirable to keep the transition of chlorine into the gas phase at the boundary layer of the first washing liquid as high as possible. On the other hand, the unconsumed chlorine at the boundary layer of the second washing stage must be absorbed again, so that no free chlorine gets into the atmosphere. This is achieved by virtue of the higher pH-value of the washing liquid in the second washing stage.

It follows from this that the content of active chlorine in the second stage would have to progressively increase if washing liquid were not fed back, to an extent corresponding to the loss of chlorine in the first washing stage, continuously or in amounts regulated by the pH-value of the first stage, from the second chlorine-washing stage to the first.

It has proved particularly advantageous if the concentration of active chlorine in the liquid of the second chlorine-washing stage is several times greater, especially twice to twenty times greater, than the concentration of active chlorine in the liquid of the first chlorine-washing stage.

The reaction at the boundary layer of the washing liquid of the first chlorine-washing stage occurs particularly well when the concentration of active chlorine therein is about 0.1 to 3 g per liter of washing liquid.

It is known that the deodorising chemical reactions of the various odour-carriers, simultaneously present in the waste gas, with active chlorine depend very greatly on the pH-value of the washing liquid. It can therefore be advantageous to insert between the first and the second chlorine-washing stages at least one intermediate washing stage, in which the waste gas is subjected to the action of a washing liquid having a pH-value situated between that of the first chlorine-washing stage and that of the last. The control can be effected by the washing liquid being fed in regulated doses from the following washing stage, in terms of the gas-flow direction, back to the preceding washing stage.

It occurs that waste gases contain intensely odorous substances which cannot be sufficiently deodorised by active chlorine, and/or which lead to an undesirable consumption of active chlorine. Such substances are, for example, ammonia and amines. It is recommended in this case to subject the waste gas to be deodorised, before introduction into the first chlorine-washing stage, to at least one preliminary washing operation. Where amines are present, a suitable washing procedure for this purpose is one using large amounts of water with a single passage through of the waste gas; or preferably a circulation washing system with washing liquids containing hydrochloric acid or sulphuric acid is used.

Particularly in the case of a higher content of sulphur-containing, malodorous substances, it is recommended that relatively easily oxidisable fractions be caused to react, by a preliminary washing with a washing liquid containing oxidation catalysts, with atmospheric oxygen, as a result of which there are formed odourless compounds, and, furthermore, appreciable amounts of chlorine can be saved in the subsequent treatment according to the invention in the chlorine-washing stages.

When certain odorous substances are present, it can be advantageous to carry out both a preliminary washing with an acid washing liquid and one with oxidation catalysts, in the given sequence.

In particularly stubborn cases of contamination, where odorous substances are present which cannot be completely decomposed either by the pretreatments or by chlorine washing, the gas discharged from the second chlorine-washing stage can be subjected to a subsequent oxidation treatment, e.g. with the use of washing liquids containing ozone or chlorine dioxide. Only relatively small amounts of these comparatively expensive oxidants are consumed in this treatment. Also suitable is an after-washing with liquids containing potassium permanganate.

A preferred embodiment of the process according to the invention is further illustrated in the following with the aid of the three-part drawing showing a flow diagram of the preferred embodiment.

This plant comprises as the most essential equipment a washer 1 for the first chlorine-washing stage, a washer 2 for the second chlorine-washing stage, feed pipes 3, 4 for the waste gas to be purified, between which is inserted a pre-washer 5. From washer 1, the waste gas treated therein passes through the connecting duct 6 into the washer 2, and from here the purified air is drawn through the air-outlet pipe 7 and the blower 43 into the chimney 44. Instead of the washing towers 1, 2 and 5 shown in the drawing, it is also possible to use Venturi washers. From the storage container 8 for chlorine gas, chlorine gas is fed through the chlorine-feed pipe 9 to the chlorine injector 10, by which it is injected into the liquid-circulation system 11. Through the circulation system 11, washing liquid is pumped up by means of pump 13 from the sump 12 of washer 1, and in the one case it passes through the branch pipe 14 and spraying nozzle 15, and is sprayed downwards against the flow of exhaust air or waste gas onto the tower packing material 16 located in the middle zone of washer 1; and in the other case washing liquid passes through chlorine-injector 10 and from this it is introduced into the zone situated, in washer 1, below the tower packing material 16 and above the level of the liquid in sump 12, and from this zone it is sprayed by means of nozzle 17, in the direction of the flow of waste gas entering from the outlet aperture 4a of feed pipe 4, into the waste gas or exhaust air.

In the illustrated embodiment of the deodorising plant, the pre-washed exhaust air from the prewasher 5, further described below, passes by way of feed pipe 4 through a drop separator 18 into the first chlorine washer 1, and in this it flows, charged with active chlorine, up through a perforated carrier grid 19 and through the tower packing material 16 supported by the grid into the space above the packing material 16; in which space it is charged, in the counterflow from the nozzle 15, with the circulation liquid from sump 12, and continues on through the drop separator 20 into the connecting pipe 6 leading to the washer 2. Washer 1 is fitted, in the usual manner, with an overflow 12a for regulation of the liquid level in sump 12, and with a liquid-offtake tube 12b for liquid dripping down from the packing material 16 into the sump 12. Finally, the washer 1 is also provided with a control device for the control of the pH-value of the liquid in circulation system 11 and sump 12; this device is to be described in detail further on in the text. The washer 2 has in the centre zone tower packing material resting on a grid 29, similar to that in the washer 1, and a sump 22 with overflow 22a; it also has a circulation system 21, through which, by means of a pump 23, liquid is pumped from the sump 22 up into the upper part of the washer 2, and there it is sprayed from the nozzle 25, in the flow direction, into the air supplied from the washer 1. To the circulation system 21 there is continuously supplied, governed by a pH-control system to be further described below, 40 to 30 percent sodium hydroxide solution from an alkali liquor tank through a liquor-feed pipe 24. Circulation liquid can be transferred, likewise regulated by the pH-control system to be further described, from the circulation system 21 of the washer 2 via the transfer-feed pipe 27 into the circulation system 11 of the washer 1. Finally, washer 2 is also fitted with an overflow 22a; and the level of the liquid in the sump 22 is maintained by a float valve 41, which controls the flow of softened water from a softener 55 through the soft-water feed pipe 42. From the washer 2, the exhaust air or waste gas purified therein passes through a drop separator 28 into the exhaust-air pipe 7, and from this, e.g. through a blower 43, into the chimney or stack 44. The exhaust air or waste gas discharged through chimney 44 into the outside atmosphere is continuously tested, by means of the chlorine-measuring probe 45, for the presence of free chlorine in the chimney; if the probe detects free $Cl_2$, then the $Cl_2$-regulator 46 closes, through the electric circuit 47, the valve 47a in the chlorine-feed pipe 9.

Gas samples taken by the measuring probe 45 in the chimney 44 are combined in the absorption vessel 50 with amounts of sodium hydroxide solution and softened water, which amounts are mixed in the mixing vessel 49, provided with a pH-control device (not shown) controlling the dosing pump 48, before being supplied at a rate controlled by the dosing pump 48; the mixture from the absorption vessel 50 is then fed to the $cl_2$-control device 46, from where the liquid can be led off into the sump 22 of the washer 2.

In the following is now described the control of the content of active chlorine, and of the pH-value of the washing liquids used in the washers 1 and 2. The content of active chlorine in the entire system of washers 1 and 2 is governed by a $Cl_2$-controlling device 56, which automatically opens and closes, through the electric circuit 57, the valve 57a in the chlorine-supply pipe 9, depending on whether the supply of free chlorine in the system requires to be increased or reduced, in order to maintain a given rated value. The $Cl_2$-controlling device 56 obtains its measuring liquid from the mixing vessel 59, in which this measuring liquid is brought, by means of the pipe 59a, into intensive contact with a partial flow of the outlet gas of the washer 1. The liquid fed to the mixing vessel 59 through the pipe 51 consists of a flow of water from the softener 55 via the pipe 55a regulated by the dosing pump 58 and a small flow of liquid, regulated by the dosing pump 54, from the pH-mixing vessel 52 provided with pH-transmitter 53. The pH-measuring vessel 52 is supplied through pipe 51 with circulation liquid of the washer 1. The pH-transmitter 53 automatically opens, should the pH-value in the pH-measuring vessel 52 fall too much, the transfer valve 60 connected to the circuit 53a, as a result of which, circulation liquid having a higher pH-value can flow from the circulation system 21 of the washer 2 through the transfer pipe 27 into the circulation system 11 of the washer 1, and thus increase the pH-value of the liquid circulating therein.

The pH-value of the liquid circulating in the circulation system 21 of the washer 2 is controlled by the pH-measuring device 62, provided with pH-transmitter 63, to which is fed a portion of the said liquid through the branch pipe 61. If the pH-value of the liquid in the circulation system 21 decreases too greatly, then the pH-transmitter 63 automatically opens the valve 64 in the alkali-liquor feed pipe 24, so that liquor flows from tank 40 into the circulation system 21 and thus increases the pH-value again of the liquid circulating therein. The measuring liquid flowing off from the measuring vessel 62 can be fed into the sump 22 of the washer 2.

An electrical cut-off device, not shown in the diagram, always switches on the dosing pump 65 when the chlorine valve 57a is opened. Dosing pump 65 and chlorine valve 57a are so synchronised with respect to each other that the supplies of chlorine and sodium hydroxide solution are in the same stoichiometric ratio as in the molecule NaCl.

If the chemical nature of the malodorant contamination of the air does not render a preliminary purification necessary, then the exhaust air or waste gas may be fed through the pipe 4 directly into the washer 1. Where, however, malodorus substances absorbable without chlorine addition, or substances upsetting the chlorine treatment, are present in the exhaust air, the exhaust air is firstly introduced through the feed pipe 3 into the pre-washer 5. This is provided, analogously to the washers 1 and 2, with a tower packing material 36, and has a sump 32 with overflow 32a. A circulation system 31 leads from the sump 32 into the space above the packing material 36 in the pre-washer 5. A pump 33 is fitted in the pipe 31, which pumps the washing liquid of the pre-washer 5 up into the said space, and then sprays it from a nozzle 35, in the flow direction, into the exhaust air or waste gas entering through pipe 3. The hydrochloric acid necessary for preliminary washing is supplied to the circulation system 31, from a hydrochloric acid supply container 38, through the HCl-feed pipe 39. The pH-value of the liquid circulating through the circulation system 31 is controlled in a pH-measuring vessel 34 with pH-transmitter 34a, to which is fed measuring liquid through branch pipe 31a. The 34a pH-transmitter automatically opens, through the electrical circuit 30, the valve 30a located in the HCl-supply pipe 39 when the pH-value in the circulation system 31 increases too greatly. Measuring liquid flowing off from the measuring vessel 34 can be fed back into the sump 32 of the pre-washer 5.

The process according to the invention renders it possible on the one hand to maintain in the second operating stage (washing liquid 22) a high concentration of active chlorine and, at the same time, a high concentration of active alkali, i.e. of unconsumed chemicals; while on the other hand there is tapped off from the first operating stage (washing liquid 12) a consumed washing liquid, which has a low content of active chemicals. The conditions are therefore such that it is possible to operate with a high level of active chlorine, although no uneconomically large amounts of active chlorine or active alkali are lost in renewing the washing liquid, and that, even with fluctuations of the content of malodorant substances in the waste gases, reliably, practically chlorine-free, purified gas is discharged into the surrounding atmosphere, without expensive chlorine dioxide or other strong oxidising agents, such as potassium permanganate, having to be used.

In the above described plant, the circulation pipes and branch pipes to the measuring devices are preferably made from PVC, and the other feed pipes preferably from polyethylene. Naturally, however, any other suitable acid-resistant and/or alkali-resistant material can be used for the purpose.

The operation of the plant according to the invention is further illustrated in the following by a number of application examples.

EXAMPLE 1

In the biosynthesis of cephalosporin, large amounts of air are passed through fermenters and in the process become contaminated with sulphur-containing, volatile, obnoxiously smelling organic substances. Several fermenters are connected to a common main and give off varying quantities of malodorus air, depending on the prevailing state of the discontinuously operating fermentation processes. The collected quantities of contaminated air contain at times up to 1 percent of $CO_2$, but little to no amine.

The previously described plant without the pre-washer 5 is used to deodorise the contaminated air (exhaust air); the exhaust air to be treated is therefore fed directly through the feed pipe 4 into the first washing tower (washer 1). The alkali liquor tank 40 is charged with 10 percent sodium hydroxide solution. The pH-regulator 63 ensures that the pH-value of the liquid circulating in the second tower (washer 2) is maintained above 8.5. If the pH-value falls below 8.5, then the pH-transmitter 63 opens the valve 64. For the continuous renewal of the circulation liquid in the circulation system 11 of the first tower, 10 percent by weight of the circulating liquid is removed hourly from the pressure pipe between pump and tower 1, and fed through a pipe line, not shown, into the drainage system.

A float-valve control arrangement controls the addition of fresh water. The pH-value in the first washing tower is kept between 6.3 and 6.8. If the pH-value sinks below 6.5, valve 60 in the transfer pipe 27 is automatically opened, and liquid of a higher pH is fed from the circulation system 21 into the circulation system 11.

The content of active chlorine is maintained at 0.2 g/l by $Cl_2$ being added at the rate controlled by the $Cl_2$-measuring device. Chlorine is carried by the flow of exhaust air or waste gas from the first tower into the second. As mentioned in the general description of the invention, there occurs simultaneously with the chlorine addition to the first chlorine-washing tower an addition of a stochiometric amount of sodium hydroxide solution to the second chlorine-washing tower. In continuous operation, there is established in the second tower a chlorine content of between 1 and 5 g/l. The air flowing from tower 2 contains no harmful amounts of chlorine. The system operates for an unlimited length of time in a stable condition, in spite of fluctuations of the content of malodorus substances occurring as a result of the switching on and off of fermenters.

The described purification process results in a surprisingly better degree of deodorisation, and the consumption of NaOH and chlorine is only a fraction of that resulting in the case of other single stage or two-stage exhaust-air washing processes.

The liquid taken off from the first tower contains, in addition to small amounts of chlorine, mainly NaCl, and no significant amounts of unconsumed alkali.

EXAMPLE 2

The plant incorporating the pre-washer 5 is used. Iron chelate of tetrasodiumethyldiaminetetraacetate is added in amounts of about 2 percent to the circulation system of the preliminary washing tower (pre-washer 5). The chelate catalyses the oxidation of sulphur compounds by atmospheric oxygen. By virtue of this pre-oxidation, more than half the amounts of chlorine necessary according to Example 1 can be saved. The amount of chlorine consumed in Example 1 was 120 g of chlorine per 1,000 m$^3$ of exhaust air. With pre-oxidation, the consumption per 1,000 m$^3$ of exhaust air is reduced to about 50 g of chlorine. The consumption of NaOH, relative to weight, is approximately equal to that of chlorine, and is likewise reduced by the pre-oxidation treatment.

EXAMPLE 3

Sewer sludge from a waste-water purification plant is converted by heating into a form suitable for filtration. This process of thermal conditioning leads to the evolution of intensely odorous gases, the bulk of which is destroyed by combustion. In practice, however, it is impossible to avoid the atmosphere of the filtration bay becoming contaminated with malodorus substances.

The previously described plant with three washing towers is used for the purification of the air extracted from the work bay by suction, with the second and third tower being operated as in Example 1, except that the pH-values are different.

The first washing tower (pre-washer 5), which is installed ahead of the other two washing towers, is operated with water, to which hydrochloric acid has been added. The pH-value should be below 2. Ammonia and amines are washed out by this preliminary washing treatment. The second washing tower (washer 1), to the washing-liquid circulation system of which elementary chlorine is added, is adjusted to have a pH-value of 7.5 to 8.5, in consequence of which an optimum oxidation potential is established. This adjustment is effected by the addition of circulation liquid from the third washing tower (washer 2). The pH-value in the last washing tower is kept between 9.0 and 10.0 by the addition of 10 percent sodium hydroxide solution.

The purified volumes of air cause no smell nuisance in the surrounding area. The consumption of chlorine is approximately equal to that of sodium hydroxide solution, and amounts to 5 g per 1,000 m$^3$ of exhaust air or waste gas. The content of active chlorine in the liquid of the second washing tower is between 0.5 and 2 g/l; and that in the third tower between 6 and 10 g/l. The chlorine consumption per 1,000 m$^3$ of exhaust air is 14 g: the consumption of NaOH (100%) is 20 g.

EXAMPLE 4

15,000 m$^3$/h of exhaust air from a production plant for organic chemicals are contaminated by sulphur-containing, intensely odorous substances. A plant having three gas-washing stages is used for purification, with an additional washing tower being inserted after the towers of the plant used in Example 1.

The first stage (washer 1) is operated with a pH of 7 to 8, and the second stage (washer 2) with a pH of 9 to 9.5. The pH-value of the second stage is adjusted by the addition of NaOH, and that of the first stage by transfer of washing liquid from the second stage through the transfer pipe 27.

The chlorine content of the first washing stage is adjusted to 0.5 to 1 g/l by the addition of gaseous chlorine into the pressure feed pipe (injector 10) of the liquid-circulation pump.

An after-washing tower, of the same construction as the pre-washer 5, is connected to the outlet pipe of the washer 2 in such a manner that feed pipe 3 of the pre-washer 5 is connected to the flange 3a at the outlet of tower 2, and the outlet flange 7a of the pre-washer 5 to the air-outlet pipe 7. The washing medium used for the third tower is weakly ozone-containing water, or water with about 5 g of chlorine dioxide per liter and a pH of 6.

The third washing tower has an independent liquid circulation system, without connection to the towers 1 and 2. The purpose of the third tower is to decompose residues of intensely odorous substances which have not been affected by the treatment with chlorine.

Since the main proportion of the oxidisable substances is decomposed in the towers 1 and 2, the consumption of ozone or chlorine is low: expressed as chlorine equivalent, it is below 15 percent of the chlorine consumption in the tower 2.

EXAMPLE 5

About 5,000 m$^3$/h of collected exhaust air from a production plant for organic chemicals contains, in amounts varying greatly over a period of time, intensely odorous substances, such as amines, hydrogen sulphide, mercaptans and thioethers, as well as traces of metal oxides and salts in aerosol form.

An exhaust-air washing plant having four washing towers is used for purification; the first of the four towers corresponds to the pre-washer 5 of the initially described plant according to the invention, and the second tower to the washer 1. The third tower is inserted into the connecting pipe 6, and corresponds in construction and equipment to the washer 1, and the fourth tower corresponds to the washer 2. The washing liquid of the first tower is a sulphuric acid having a strength of 10 weight-% h$_2$SO$_4$, which is used until its strength has dropped below 1 weight-%. The following washing towers are operated with washing liquid containing active chlorine. The pH-value in the second tower is maintained between 6.5 and 7.0, in the third tower between 7.5 and 8.0, and in the last tower between 9.0 and 9.5.

The liquid containers of all four towers are fitted with a level control device, which supplies fresh water as soon as the level falls below a set point. A limited fall of the level below this point is however permissible. 20 percent NaOH solution is only used in the fourth tower for the control of the pH-value. The pH-value of the third tower is regulated by the addition of washing liquid from the fourth tower: and the pH-value of the second tower by the addition of washing liquid from the third tower. Depending on requirements, elementary chlorine is introduced into the gas (injector 10), continuously or intermittently, before the second tower, with the amount of chlorine being adjusted as follows:

There is continuously removed from the second tower 10 l/h of washing liquid and this is diluted with a constant stream of water of 90 l/h. The resulting flow of liquid is passed through a packing-material column (100 mm diameter, 500 mm in height). Flowing through this column is a partial stream of 100 m³/h of the outlet gas from the second tower. After the liquid in the described column has been brought into intensive contact with the outlet gas from the second tower, it passes through a chlorine-excess measuring device. A maximum-minimum contact of this measuring device controls the chlorine addition in the second tower with adjustable limits.

By virtue of the described measures, the chlorine addition is made dependent not only on the chlorine content of the washing liquid of the second tower, but also on the chlorine content of the gas between the second tower and the third tower.

In spite of large fluctuations in the amount of oxidisable substances in the waste gas, and in spite of a varying content of active chlorine in the washing liquids of the second to the fourth tower, the plant renders possible a practically complete deodorisation with a chlorine consumption of less than 8 kg/day. All percentages mentioned in this application are given as weight-%.

I claim:

1. In a process for deodorising waste or exhaust gases in at least two washing stages with introduction of active chlorine, wherein a stream of the waste gas to be deodorised is subjected in an initial chlorine washing stage to the action of a washing liquid containing active chlorine, and in a subsequent chlorine washing operation to the action of a washing liquid, likewise containing active chlorine, of alkaline pH, the improvement comprising
   a. the supplied active chlorine is practically free from chlorine dioxide;
   b. a content of at least 0.02 g of active chlorine per liter of washing liquid is maintained in at least one of the washing stages;
   c. the pH-value of the washing liquid in the first washing stage, through which the waste gas to be purified, is flowing, is kept to between 4 and 9, and
   d. the pH-value of the washing liquid in the subsequent washing stage is kept between 7 and 11, with the pH-value in the said subsequent washing stage being adjusted to remain higher by 0.3 to 4 than the pH-value in the first stage;
   e. active alkali is added in an approximately stoichiometric amount, calculated on the total active chlorine supplied, in a subsequent washing stage.

2. Process as described in claim 1, wherein the washing liquid containing active chlorine is obtained by addition of gaseous chlorine to the waste gas, to be deodorised, before its introduction into the first chlorine washing stage.

3. Process as described in claim 1, wherein the washing liquid containing active chlorine is obtained by injection of chlorine into the washing liquid.

4. Process as described in claim 1, wherein the employed source of active chlorine is aqueous hypochlorite solution, preferably sodium hypochlorite solution.

5. Process as described in claim 1, wherein the consumed alkali in the washing liquids is replaced by introduction of fresh alkali, preferably sodium hydroxide solution, in the subsequent chlorine washing stage, and wherein, optionally, washing liquid containing active chlorine is transferred from the subsequent washing stage to the first, either continuously or, preferably, in dosed amounts depending on the pH-value of the first chlorine washing stage.

6. Process as described in claim 1, wherein the waste gas to be deodorised contains at least 0.05 percent by volume of $CO_2$.

7. Process as described in claim 1, wherein depending on the loss of chlorine in the first washing stage, washing liquid is fed back, continuously or in amounts controlled by the pH-value of the first stage, from the subsequent chlorine washing stage to the first chlorine washing stage.

8. Process as described in claim 1, wherein the content of active chlorine in the washing liquid of the subsequent chlorine washing stage is higher than that in the first chlorine washing stage.

9. Process as described in claim 8, wherein the concentration of active chlorine in the liquid of the subsequent chlorine washing stage is a number of times greater, preferably about two to twenty times greater, than the concentration of active chlorine in the liquid of the first chlorine washing stage.

10. Process as described in claim 2, wherein alkali (e.g. NaOH or $Na_2CO_3$) is added in the subsequent chlorine washing stage, simultaneously or after a short delay, as soon as active chlorine not coming from the washing liquid of the subsequent chlorine washing stage is added to the first chlorine washing stage.

11. Process as described in claim 1, wherein the concentration of active chlorine in the washing liquid of the first chlorine washing stage is about 0.1 to 3 g per liter of washing liquid.

12. Process as described in claim 1, wherein there is inserted between the first and the subsequent chlorine washing stage an intermediate washing stage, in which the waste gas is subjected to the action of a washing liquid having a pH-value of between that of the first chlorine washing stage and that of the last chlorine washing stage.

13. Process as described in claim 1, wherein the waste gas to be deodorised is subjected to at least one preliminary washing operation before introduction of the waste gas into the first chlorine washing stage.

14. Process as described in claim 1, wherein, with the presence of amines in the waste gas, the waste gas is subjected to an acid pre-treatment.

15. Process as described in claim 14, wherein the washing liquid in the acid pre-treatment contains hydrochloric acid or sulphuric acid.

16. Process as described in claim 13, wherein the washing liquid in the preliminary washing stage contains oxidation catalysts, with the aid of which the oxidisable constituents of the waste gas are caused to react with the oxygen of the atmosphere.

17. Process as described in claim 12, wherein two preliminary washing stages are used, of which the one operates with an acid washing liquid and the other with an oxidising washing liquid.

18. Process as described in claim 1, wherein the purified gas discharged from the subsequent chlorine washing stage is subjected to an after-oxidation.

19. Process as described in claim 18, wherein an ozone-containing washing liquid is used for the after-oxidation treatment.

20. Process as described in claim 18, wherein a washing liquid containing chlorine dioxide is used for the after-oxidation treatment.

21. Process as described in claim 18, wherein a washing liquid containing potassium permanganate is used for the after-oxidation treatment.

22. Process as described in claim 1, wherein the pH-value of the washing liquid in the subsequent chlorine washing stage is maintained at 7.5 to 8.5.

* * * * *